March 7, 1961　　　I. J. MARRIAGE　　　2,973,924
APPARATUS FOR CHANGING THE PITCH OF
PROPELLER BLADES FOR AIRCRAFT
Filed Nov. 5, 1956　　　9 Sheets-Sheet 1

INVENTOR.
Ira J. Marriage.
BY
Fishburn & Gold
ATTORNEYS.

March 7, 1961  I. J. MARRIAGE  2,973,924
APPARATUS FOR CHANGING THE PITCH OF
PROPELLER BLADES FOR AIRCRAFT
Filed Nov. 5, 1956  9 Sheets-Sheet 3

INVENTOR.
Ira J. Marriage.
BY Fishburn and Gold
ATTORNEYS.

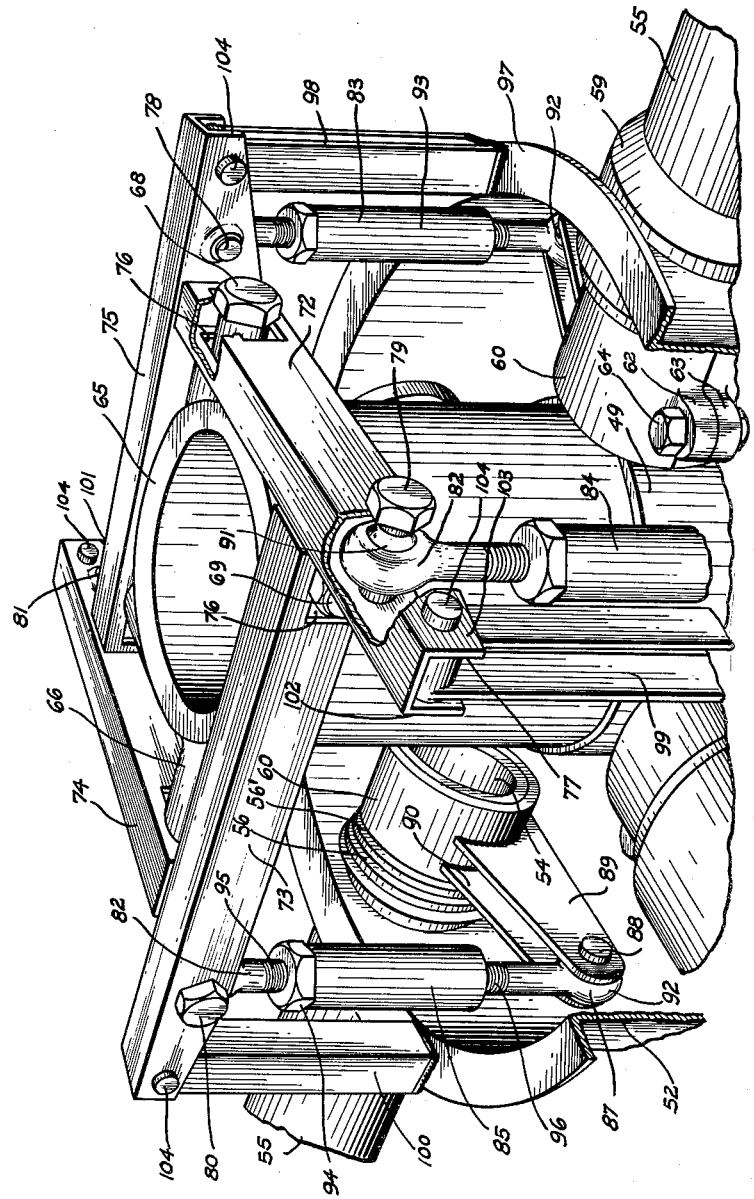

March 7, 1961
I. J. MARRIAGE
2,973,924
APPARATUS FOR CHANGING THE PITCH OF
PROPELLER BLADES FOR AIRCRAFT
Filed Nov. 5, 1956
9 Sheets-Sheet 5
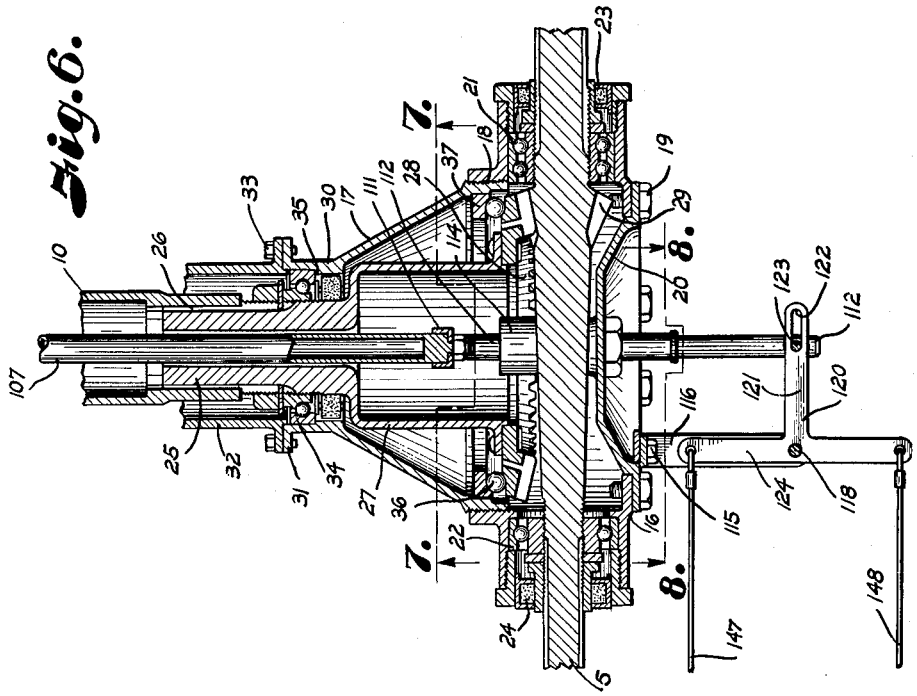
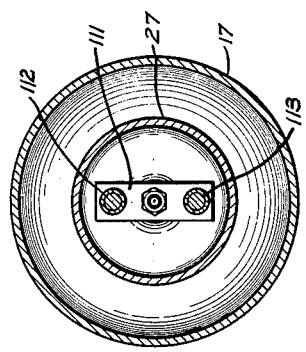
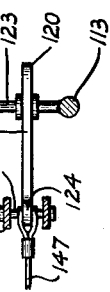
INVENTOR.
Ira J. Marriage.
BY
Fishburn & Gold
ATTORNEYS.

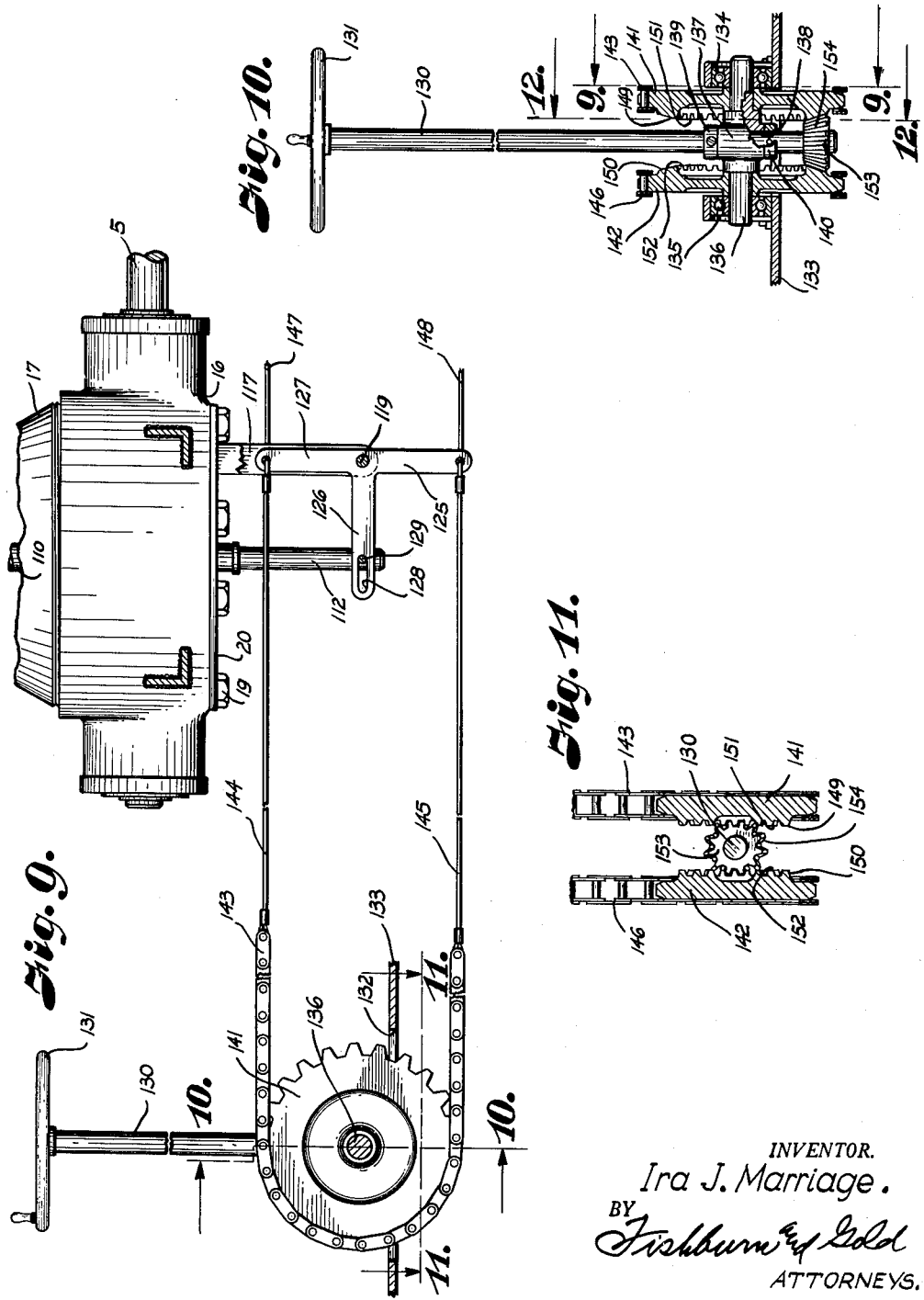

March 7, 1961

I. J. MARRIAGE 2,973,924

APPARATUS FOR CHANGING THE PITCH OF
PROPELLER BLADES FOR AIRCRAFT

Filed Nov. 5, 1956

INVENTOR.
Ira J. Marriage.
BY Fishburn and Gold
ATTORNEYS.

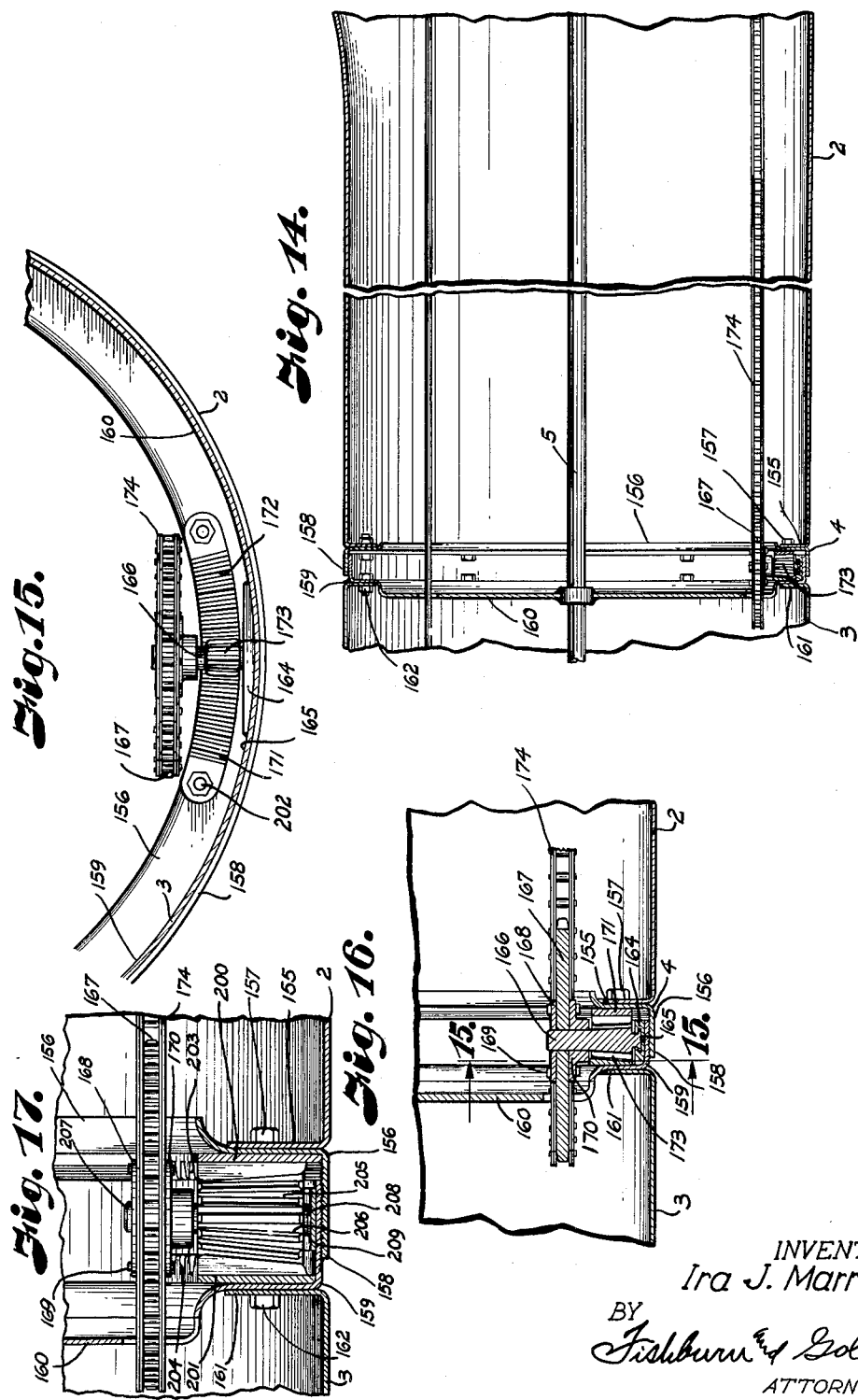

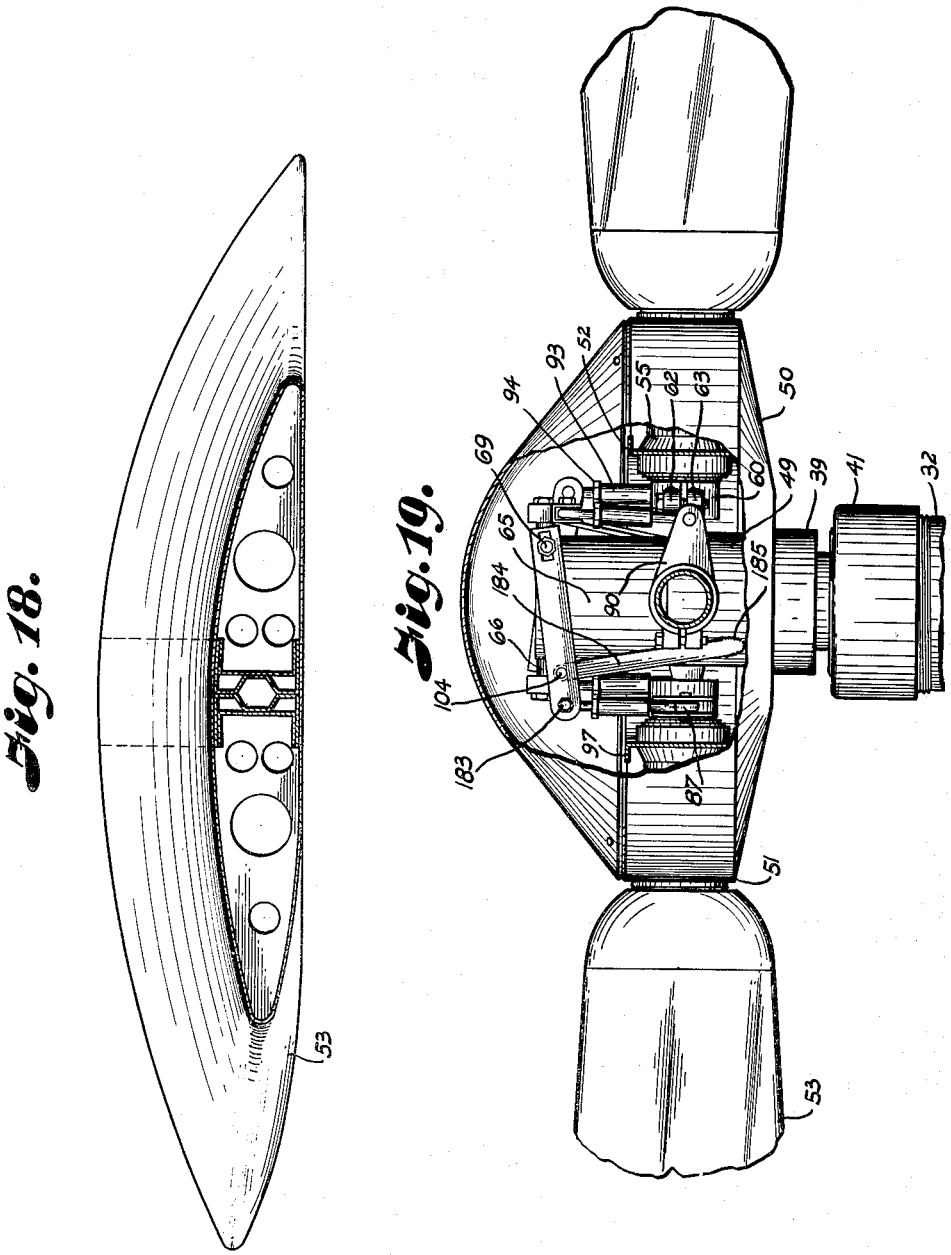

United States Patent Office 2,973,924
Patented Mar. 7, 1961

2,973,924

APPARATUS FOR CHANGING THE PITCH OF PROPELLER BLADES FOR AIRCRAFT

Ira J. Marriage, 4520 State, Kansas City, Kans.

Filed Nov. 5, 1956, Ser. No. 620,396

6 Claims. (Cl. 244—17.23)

This invention relates to improvements in aircraft of the helicopter type, and more particularly to apparatus for controlling the tilting or slanting of the blades of the propellers, the present invention being an improvement over my Patent No. 2,488,018.

The principal object of the present invention is to provide apparatus for controlling the pitch or slant of the blades of the propellers for helicopters from the operators seat by movement of a vertical rod extending through the vertical drive shaft upon which the propellers are mounted, the rod having connection with the hub of the blades for tilting the same as desired.

Other objects of the present invention are to provide an aircraft capable of making a vertical takeoff and landing in a small space; to provide a fuselage of two sections having a horizontally disposed propeller above each section of the fuselage for carrying propulsion and guiding means for said aircraft; to provide apparatus for tilting the propeller blades to slat the same either upward or downward from a horizontal inclined position and to tilt the entire group of blades on each propeller simultaneously and independently one of the other; and to provide a means of propulsion whereby the aircraft may be efficiently controlled in mid-air as to speed, directional flight, altitude and turning of the aircraft on a vertical axis for quick landing or heading of the aircraft as to direction.

Further objects of the invention are to provide guide means on the vertical shafts in each fuselage section for a cylindrical member upon which the slanting mechanism is mounted; to provide means for raising and lowering the cylindrical mechanism; to provide arms connected to said cylindrical member which in turn are connected to the propeller arms for rotational movement of same to tilt the blades thereon; to provide means on said vertical shaft for mounting the propeller blades thereon; to provide apparatus for raising and lowering the cylindrical member through the vertical shaft mechanism and attached below the drive shaft of the fuselage section; and to provide gear mechanism operating with the drive shaft for rotating the vertical shafts in said fuselage section.

Other objects of the present invention are to provide for directional control of the aircraft by providing a fuselage in two separate parts fastened together by interlocking members and having sprocket and gear mechanism attached to the ends of the fuselage section for varying the slant of the propeller shafts from a horizontal position and tilting said propeller transverse to the alignment of the fuselage; and to provide an apparatus of this character simple and economical to manufacture.

A still further object of the invention is to provide means for changing the pitch of the propellers simultaneously by a rotational movement of the fuselage sections from the operator's compartment.

In accomplishing these and other objects of this invention I have provided improved details of structure the preferred forms of which are illustrated in the accompanying drawings, wherein:

Fig. 5 is an enlarged fragmentary perspective view showing the connection of the tilting arms of the blades to the cylindrical member at the upper end of the vertical shafts.

Fig. 6 is a vertical cross-sectional view particularly illustrating the drive shaft through the fuselage and the gear and pinion connection with the vertical drive shafts for the propellers.

Fig. 7 is a cross-sectional view taken on a line 7—7, Fig. 6, illustrating the connection with the vertical rod through the drive shaft for raising and lowering the same.

Fig. 8 is a cross-sectional view taken on a line 8—8, Fig. 6.

Fig. 9 is a fragmentary partly cross-sectional view of the apparatus for raising and lowering one of the connecting rods for changing the pitch of the blades on one propeller, taken on a line 9—9, Fig. 10.

Fig. 10 is a cross-sectional view taken on a line 10—10, Fig. 9.

Fig. 11 is a cross-sectional view taken on a line 11—11, Fig. 9.

Fig. 14 is a cross-sectional fragmentary view of the center portion of the fuselage section showing the apparatus for connecting the same together, taken on a line 14—14, Fig. 2.

Fig. 15 is a cross-sectional view taken on a line 15—15, Fig. 16.

Fig. 16 is a cross-sectional view illustrating the gear and pinion connection for rotating the fuselage sections.

Fig. 17 is an enlarged fragmentary cross-sectional view of a modified form of apparatus for rotational movement of the fuselage sections.

Fig. 18 is a transverse cross-section through one of the propeller blades.

Fig. 19 is a view of a modified form of the apparatus for tilting the propeller blades at the top of the cylindrical members with parts broken away to better illustrate the structure.

Figure 1:
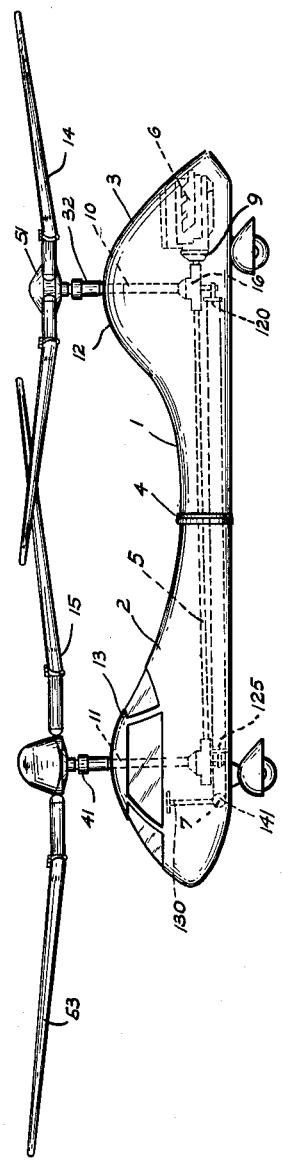
Fig. 1 is a side view of an aircraft embodying the features of my invention with the drive shaft through the fuselage and motor and clutch assembly shown in dotted lines as well as the vertical shafts along which the propellers are mounted.

Referring more in detail to the drawings:

1 designates an aircraft embodying the features of my invention comprising a fuselage having a front section 2 and a rear section 3 rotatably secured together at substantially the center of the fuselage as indicated at 4.

The device includes a drive shaft 5 longitudinally of the fuselage and a motor 6 mounted in the rear section 3, control mechanism in the front section 2 as indicated at 7. The motor 6 includes the usual clutch mechanism 9 for transmitting power to the propulsion element hereinafter described. These propulsion elements are identical in detail except the driving power is applied oppositely to each propeller for driving the same in opposite directions and the leading edges of the blades of one propeller are oppositely inclined with respect to the other propeller. The description herein will refer to the mechanism of the rear propeller presently but as far as the driving means is concerned it is identical with the propeller mechanism for the forward fuselage section.

I have here shown one motor located in the rear fuselage section. The motor 6 is mounted close to the journal box gear housing and within its own fuselage section so that the power to the power takeoff can be supplied through an auxiliary shaft (not shown) from the rear end of the motor in said rear section.

The vertical shafts shown in dotted lines in Fig. 1 and indicated at 10 and 11 are mounted at substantially the center of the domes 12 and 13 of the fuselage sections 2 and 3 and extend thereabove, also as illustrated in Fig. 1. Propellers 14 and 15 are mounted upon the upper ends of the shafts 10 and 11 as will later be described. As the drive shafts and mechanism are the same only one will be described.

The tubular vertical drive shaft 10 is mounted in the rear fuselage section and has connection with the main horizontal drive shaft 5 by means of a toothed gearing at the base of each propeller through a journal box 16 at each bearing point as illustrated in Fig. 1, and being screw threadedly connected to a ring gear housing 17 as indicated at 18. Fastened to the underneath side thereof by cap screws or the like 19 is a plate 20. The drive shaft 5 extends through the journal box and includes bearings 21 and 22 on each end thereof and an oil seal 23 and 24 so as to make an oil tight seal for the shaft and gear mechanism.

The lower end of the tubular drive shaft 10 is spline fitted to the vertical shank portion 25 as indicated at 26 (Fig. 6) of a ring gear hub 27 to the lower end of which is attached a ring gear 28 adapted to mesh with a pinion gear 29 formed integral with the drive shaft 5. The ring gear housing 17 has an upper extending neck 30 provided with a laterally turned flange 31 secured to a tubular housing 32 by cap screws 33. The tubular housing enclosing the drive shaft 10 within the upper neck portion 30 of the gear housing 17 has an annular thrust bearing 34 having its outer race seated on the shoulder 35 in said neck portion and its inner race threadedly engaged with the ring gear hub 27 thus serving as adjusting means for proper spacing of the ring gear 28. A thrust bearing 36 is located between the upper surface of the ring gear and a ring member or shoulder 37 of the housing for smooth rotation of the ring gear 28 therein.

Figure 3:
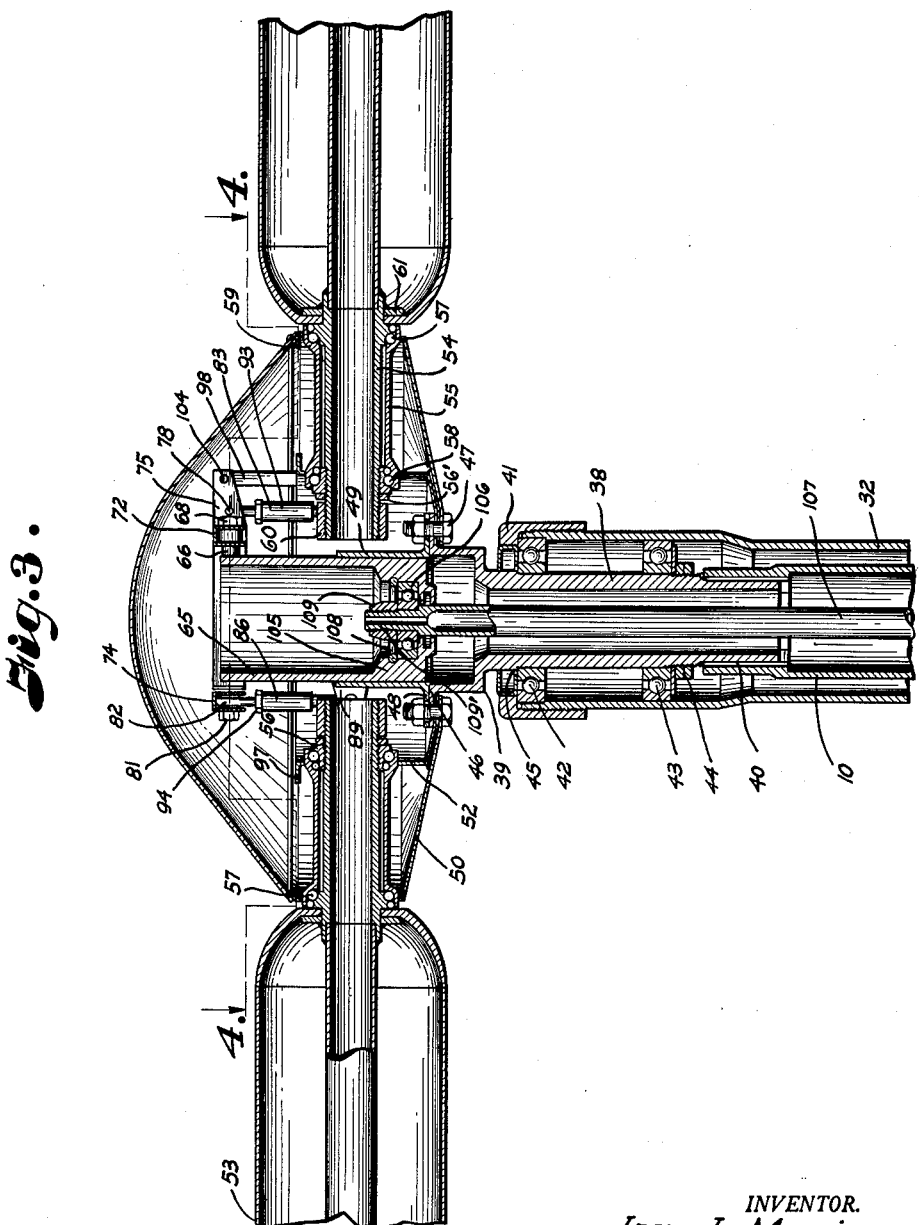
Fig. 3 is a vertical cross-sectional view illustrating the head of the propeller and the rod connection therewith for changing the pitch of the blades.

The upper end of the drive shaft 10 is spline fitted to the shank portion 38 of a hub element 39 as indicated at 40 (Fig. 3). The housing 32 is externally threaded at its upper end and closed by a cap member 41 surrounding the shank portion 38 of the hub element 39 and provided with spaced bearings 42 and 43 and it will be seen that the outside ball races are attached to the interior of the housing 32 and the corresponding interior races are secured to the shank 38 of the hub member 39 the lower end of which is threaded to receive a nut 44 threadedly engaging thereon to prevent longitudinal movement of the hub in one direction and in the other direction through the shoulder 45 abutting against the inner race of the upper bearing 42.

The upper end of the hub 39 is flanged as indicated at 46 (Fig. 3) and secured thereto by bolts or the like 47 is the flanged end 48 of a tubular guide member 49. The bolts 47 also serve to secure the bottom 50 of a housing 51 for enclosing the tilting mechanism for the propeller blades as later described.

Located within the housing 51 and secured to the hub element 39 by the bolts 47 is a head 52 for carrying the propellers 14 and 15. Each propeller includes a plurality of blades 53 having tubular shanks 54 mounted in sleeved members 55 and threadedly secured thereto as indicated at 56 (Fig. 3). To insure easy rotational adjustment of the propeller blades the shanks 54 are secured in annular ball bearings 57 and 58, the former being adaptable to take thrust from the blade and the latter being seated against shoulders 59 within the sleeve or housing 55 which are integral with the head and radially positioned therein from its outer periphery. The blades are secured against centrifugal force by threaded bearing races 56, which are locked on the shanks with lock nuts 56' and rotatively secured therewith as later described. The outer ends of the shanks 54 are provided with flanges 61 to which are rigidly secured the blades 53 by suitable means such as welding. Split collar clamps 60 are threaded to fit the shanks and have ears 62 and 63, the ear 63 having a threaded opening for receiving cap screws 64 for tightening the clamp on the shanks 54 (Fig. 5).

It will thus be seen that the tubular shank elements of the blades and the means for supporting of the blades and their bearings are arranged within the housing 51 and bottom plate 50 and the latter being carried by hub member 39 by the bolts 47. The upper end portion of the tubular housing 32 for the drive shaft 10 is secured to the top of the fuselage so that the propellers extend thereabove.

Figure 4:
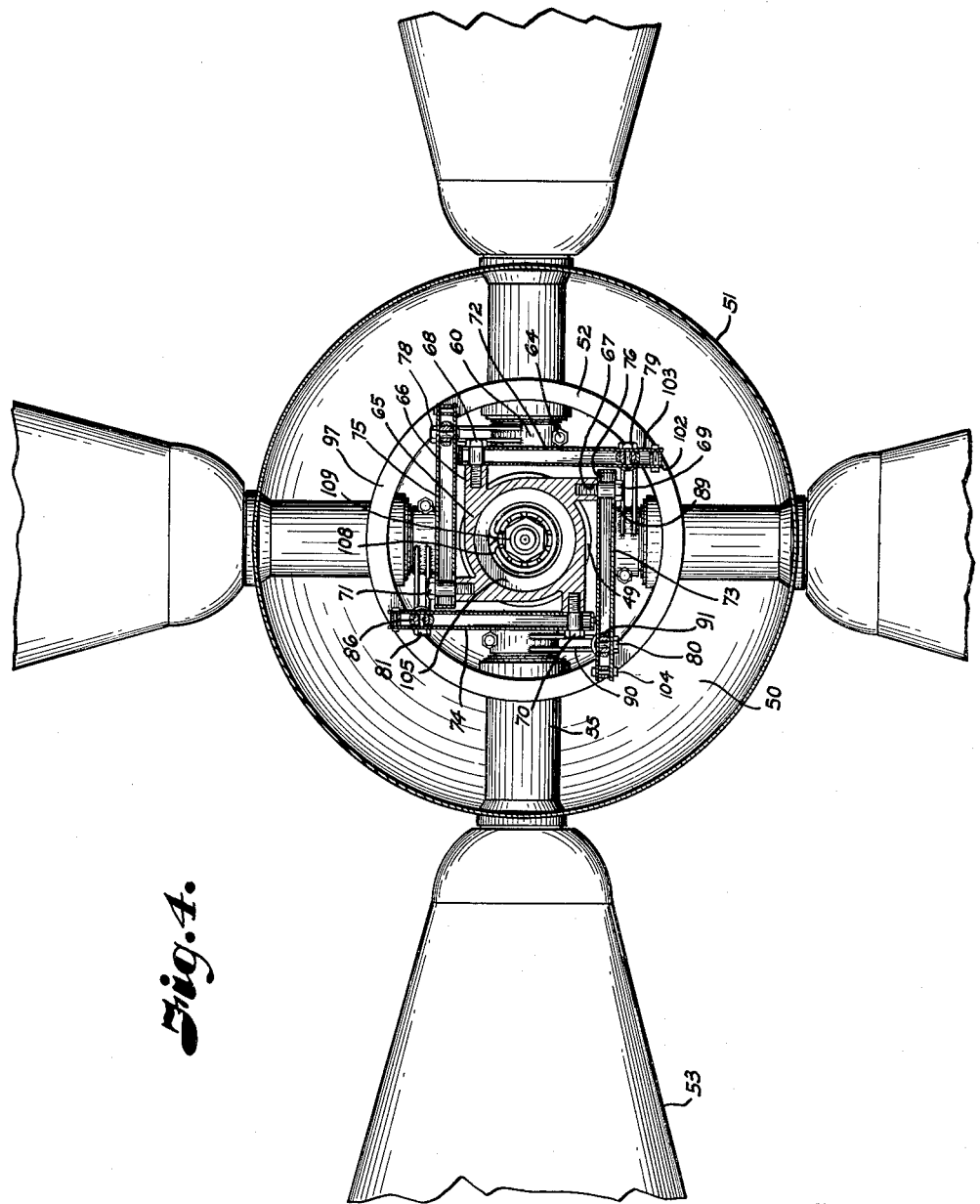
Fig. 4 is a cross-sectional view taken on a line 4—4, Fig. 3.

A cylindrical shaft member or head 65 is adapted to slide within the tubular guide 49 and has a plurality of hubs or extensions 66 spaced on the upper outer periphery thereof provided with threaded bores as indicated at 67 (Fig. 4) for receiving the threaded ends of cap screws 68, 69, 70 and 71 for pivotally mounting of arms 72, 73, 74 and 75 to said extensions of the cylindrical head. The arms are channel shaped as best illustrated in Figs. 4 and 5 and are provided with enlarged openings as indicated at 76 for the slidable reception of the cap screws for mounting of one end of the arms 72, 73, 74 and 75 for a purpose later described.

The lower or outer bottom portion of one end of the arms is cut away as indicated at 77 (Fig. 5). Pivotally mounted in said arms spaced from the ends thereof by pins 78, 79, 80 and 81 is one end 82 of connecting members 83, 84, 85 and 86 having their opposite ends 87 pivotally secured by pins 88 between spaced ears 89 and 90 which are welded or otherwise rigidly connected to the collar clamp members 60 on the extended end of the shanks 54 of the propeller blade shafts also as best illustrated in Figs. 4 and 5. The ends 82 and 87 of the connecting members 83, 84, 85 and 86 are provided with integral bearings as indicated at 91 and 92 (Fig. 5) to provide for rotational movement of the connecting members on the pins 78, 79, 80, and 81 and the pins 88 connecting the other ends of the connecting members with the ears 89 and 90.

The connecting members 83 to 86, inclusive, have a center cylindrical member 93 internally threaded to receive the threaded ends 95 and 96 of the ends of the connecting members so as to provide for adjusting the length of the connecting members as a convenient means for adjusting all blade members to uniformity of pitch. A nut 94 is provided for locking the cylindrical member after proper adjustment has been made.

The head 52 on the upper end of the propeller shafts includes an outwardly extending annular flange 97 to which are welded or otherwise rigidly secured bearing supports 98, 99, 100 and 101 and extending vertically upward with their upper ends engaging between the sides 102 and 103 of the outer ends of the arms 72, 73, 74 and 75 and pivotally connected thereto by pins or the like. It will be noted the connecting members 83, 84, 85 and 86 are connected to the arms between the ends thereof and the end of the arm connected to the succeeding extension. However, the connecting members may be connected in alignment with the end of the arms if desired. The lower end of the cylindrical head 65 is provided with a socket shown at 105 for a bearing 106 engaging the reduced end of a tubular rod 107. A ring 108 engages the bearing 106 and a threaded nut 109 engages the threaded end 109' of the tubular rod 107 to secure the rod to the cylindrical head 65. The tubular rod 107 extends downwardly through the tubular drive shaft 10 and is provided for controlling the pitch of the propeller blades.

As heretofore stated, the driving apparatus for each propeller is the same except that the propellers are driven in opposite directions. In Figs. 9, 10, 11 and 12 I have illustrated the mechanism for changing the pitch of the propeller blades on the respective propellers and the tubular rod (not shown) for the front propeller is similar to the rod 107 on the rear propeller. The rods are provided for connecting elements between the stick operating mechanism for tilting or slanting of the blades and the cylindrical head 65.

The lower ends of the rods 107 and 110 are attached to cross bars 111 which are rigidly engaged near each end thereof against the ends of a pair of slidable spacer tubes 112 and 113 (Fig. 7) which extend downwardly through guides 114 formed integrally with the plate members 20 and which extend upwardly on each side of the drive shaft 5 so that they will not interfere therewith. Secured to the lower portions of the journal box 16 by bolts or the like 115 and underneath each of the propeller mechanisms are U-shaped brackets 116 and 117 having shafts 118 and 119 at their lower ends. Mounted upon the shaft 118 of the rear propeller mechanism is a T-shaped bracket 120 having a longitudinal arm 121 provided with a slot 122 near its outer end to receive a pin 123 extending between the vertical tubes 112 and 113 as illustrated in Fig. 8.

The bracket mechanism extending below the front propeller mechanism is the same as that described for the rear propeller mechanism except that the bracket 117 is mounted to the rear of the rod 112 whereas the bracket 116 is mounted forwardly of the rod 112. The bracket 120 is pivotally secured to the bracket arm 116 by the pin or shaft 118 at the joinder of the arm 121 with the arm 124. The T-shaped bracket member 125 is pivotally mounted on the lower end of the bracket 117 by pin or shaft 119 at the joinder of the arm 126 of the bracket and the arm 127. The outer end of the arm 126 is provided with a slot 128 to receive a pin 129 carried between the lower ends of the rods 112 and 113 similarly to the connection of the bracket 120.

It will be noted that in Fig. 12 the T-shaped bracket members are oppositely faced one to the other, in other words, the longitudinal arm 121 extends rearwardly of the bracket 116 and the arm 126 extends forwardly of the bracket 117 for a purpose later described.

The guiding and controlling mechanism located in the front fuselage section 2 or cabin portion of the plane comprises a standard or stick 130 having a wheel 131 mounted on its upper end and its lower end extending through an opening 132 of a bracket or floor member 133. Spaced bearings 134 and 135 are mounted upon the bracket 133 for accommodating a shaft 136 which has an enlarged cylindrical portion 137 extending vertically therefrom. Said cylindrical portion 137 is provided with a vertical bore 138 through which the stick 130 extends and is held in place thereon by spaced collars 139 and 140. Mounted between the portion 137 and the bearings 134 and 135 are sprockets 141 and 142. The sprocket 141 is provided with teeth over which a chain 143 engages and to the free ends of which are attached cables 144 and 145 and the other ends attached to the outer ends of the arm 127 of the bracket member 125. The sprocket 142 is provided with teeth over which a chain 146 runs and to the free ends of which are attached cables 147 and 148 having their other ends secured to the outer ends of the arm 124 of the bracket member 120.

The facing sides 149 and 150 of the sprockets 141 and 142 are provided with spaced teeth 151 and 152 (Figs. 10 and 11). Rigidly mounted on the lower end of the stick 130 is a pinion gear 153 having teeth 154 adapted to cooperate with the teeth 151 and 152 in the sides of the sprockets 141 and 142 for rotating the sprockets as later described.

In Figs. 13, 14, 15 and 16, I have illustrated the rotational connection of the fuselage sections 2 and 3. The rear end of the front section 2 is turned laterally forming an annular flange 155. A circumferential cap member 156 is secured thereto by a plurality of bolts or the like 157. The cap member has a circular externally threaded flange 158 adapted to receive the threaded flange 159 of a mating cap member 160 secured to the inturned annular flange 161 of the rear fuselage section 3 by bolts or the like 162 so that a rotational movement of the sections counter to one another may be accomplished by the threaded connection of the two cap members. It will be obvious that very little rotation of the sections will be necessary to accomplish slanting of the propeller shafts.

A bearing member 164 is secured to the inside portion 165 of the rear cap member 160 as best illustrated in Fig. 16. A rotatable shaft 166 is mounted in the bearing 164 and secured to the upper end thereof is a sprocket 167 which is secured to the shaft by a plate member 168 by bolts 169 which engage a plate member 170 on the opposite side of the sprocket 167 to retain the same on the shaft. Secured to the front cap member 156 is a gear plate 171 having teeth 172 meshing with a pinion gear 173 mounted on the shaft 166 between the sprocket 167 and the bearing 164.

Figure 13:
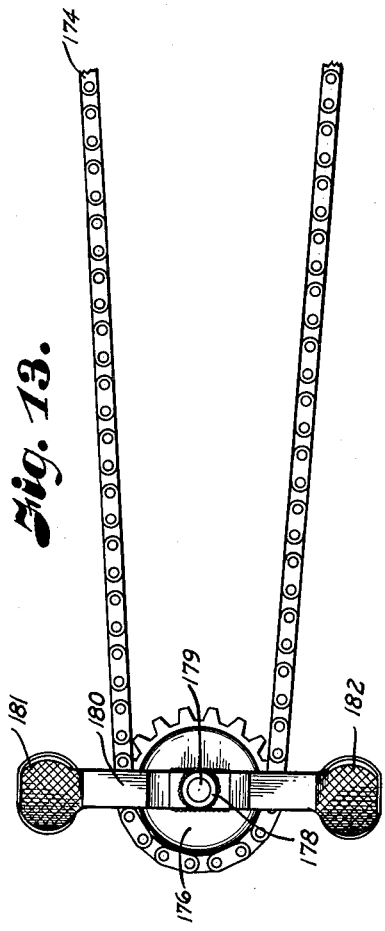
Fig. 13 is a fragmentary partly cross-sectional view of the foot pedal connection for rotating the fuselage sections.

An endless chain 174 engages over the sprocket 167 and runs over a sprocket 176 as illustrated in Fig. 13. The sprocket 176 is rigidly secured to a sleeve 178 rotatably mounted on a shaft 179 extending vertically from the floor of the operator's compartment. Rigidly mounted on the sprocket 176 and sleeve 178 is a transverse arm 180 having foot members or pedals 181 and 182 on the outer ends thereof. With movement of the foot pedals, forwardly or rearwardly, the chain 174 will operate the sprocket 167 to force rotational movement of the fuselage sections counter to each other.

In Fig. 17 I have illustrated a modified form of apparatus for accomplishing rotational movement of the fuselage sections 2 and 3. The mating ends of the sections are formed and secured together the same as illustrated in Figs. 13, 14, 15 and 16 and the respective parts are given the same numbers. The means for rotational movement of the sections consists of gear plates 200 and 201 secured to the front and rear cap members 156 and 160, respectively, by bolts or the like (not shown in Fig. 17 but illustrated at 202, Fig. 15). The gear plates have teeth 203 and 204 meshing with the teeth 205 of a pinion gear 206 mounted on one end of a shaft 207. Mounted on the other end of said shaft is the sprocket 167 to accommodate the chain 174 as in the preferred form of the invention. The end 208 of the shaft has a flat face and is adapted to bear against the inside of the flange 159 of the cam member 160 as indicated at 209. The shaft and sprocket and pinion gear thereon are loosely mounted between the fuselage sections. The pinion gear being tapered will prevent disengagement of the gears but will allow some movement between the pinion gear and gear plates 200 and 201.

Operation of the foot pedals 181 and 182 will cause the chain 174 to turn the sprocket 167 to cause rotational movement of the sections 2 and 3 in opposite directions to change the slant of the propellers.

In Fig. 19 I have illustrated a modified form of anchoring the corner posts 98, 99, 100 and 101, to the pivoted arms on the upper end of the cylindrical head 65 as illustrated in Fig. 5. In Fig. 3 I have eliminated the circumferential flange 97 on the head 52 on which the corner posts 98, 99, 100 and 101 are mounted. In the modified form I have numbered the parts with the same numbers as shown in Figs. 3, 4 and 5, where the parts are similar. In this form I have secured the connecting members 83, 84, 85 and 86 at their upper ends to the outer ends of the arms 72, 73, 74 and 75 as indicated at 183 and to each arm 72, 73, 74 and 75 spaced from the connection 183 of the connecting members I have pivotally mounted posts 184 having their lower ends rigidly secured by welding or other suitable means as indicated at 185 to the guide hub member 49 so that when the cylindrical member 65 is moved up or down through the rod 107 the arms 72, 73, 74 and 75 will pivot on the pins 104 to move the outer ends 183 of the horizontal arms 72, 73, 74 and 75 with the connecting members 83, 84, 85 and 86 up or down, which in turn due to their connection with the propeller blades, tilt or slant said blades as desired.

Figure 2:
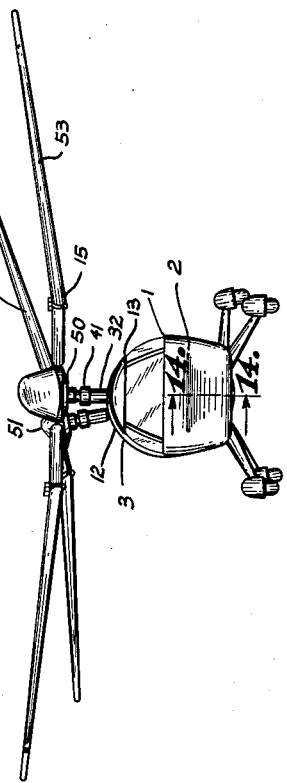
Fig. 2 is a front view showing the rear fuselage section rotated to slant the rear propeller. It is probable that each section will slant equally in opposite directions when rotated for directional control.

Operation of an apparatus constructed and assembled as described is as follows:

It will be obvious that the motor will drive the shaft 5 and through the gear connection with the ring gear hub 28 connected to the drive shaft 10 which in turn is connected to the shank of the hub element 39 upon which the head 52 is carried and to which head the shanks 54 of the propeller blades 53 are rotatably mounted will rotate the propeller. Each propeller shaft may be slanted independently of the other in either direction by a rotational movement of the fuselage section by the mechanism shown in Figs. 13, 14, 15, 16 and 17 by operation of the foot pedals 181 and 182 for rotation of the sprocket 176 whereby the sprocket 167 will rotate the gear 173 meshing with the teeth 172 on the plate 171 to give rotational movement to the fuselage sections 2 and 3 as shown in Fig. 2 thereby accomplishing a right or left turn of the aircraft. Counteraction of the effects from unequal torque on the propellers as well as the directional control system therefore includes means for rotational action of the fuselage sections and consequent tilting of the propellers counter to each other and counter to the longitudinal direction of the fuselage thus causing the aircraft to hold a fixed course or to turn as desired on the center of gravity.

The mechanism for tilting of the blades of each propeller is illustrated in Figs. 3, 4 and 5 in the preferred forms of the invention wherein, the blades of the propeller are movable through the cylindrical head 65 by attachment thereto of a plurality of arms 72, 73, 74 and 75 which have, pivoted near the outer ends thereof, connecting members 83, 84, 85 and 86 having one end connected to ears on the threaded clamp members 60 whereby the blades may be tilted in their bearings upon vertical or longitudinal movement of the rods 107 and 110 and cylindrical head 65.

Figs. 9 to 12, inclusive, illustrate the apparatus for controlling the pitch of the propeller blades on each propeller. When the stick 130 is in vertical or neutral position as shown in Fig. 9 the pitch of the blades will be at about the neutral point and both groups at the same pitch. Turning of the handwheel 131 to the right with the stick or shaft 130 and sprocket 153 thereon will cause the rotational movement of the sprockets 141 and 142 in opposite directions to each other. Thereby the sprocket 141 will pull on the cable 145 which in turn will swing the arm 126 of the T-shaped bracket member 125 upwardly thus causing an upward movement of the rods 112 and 113 of the shaft 110 thus operating the tilting mechanism in head 52 and thereby increase the pitch of the blades on propeller 15. At the same time the sprocket 142 will pull on the cable 147 which will swing the arm 121 of the bracket member 120 which in turn will move the shaft 107 upwardly to increase the pitch of the blades on propeller 14 simultaneously to the blades of propeller 15 and thereby effecting movement of the aircraft upwardly and the more pitch given to the blades the faster the aircraft will climb. Rotation of the hand wheel 131 simultaneously will lower the rods 107 and 110 and decrease the pitch of the blades and lower the aircraft when desired.

Figure 12:
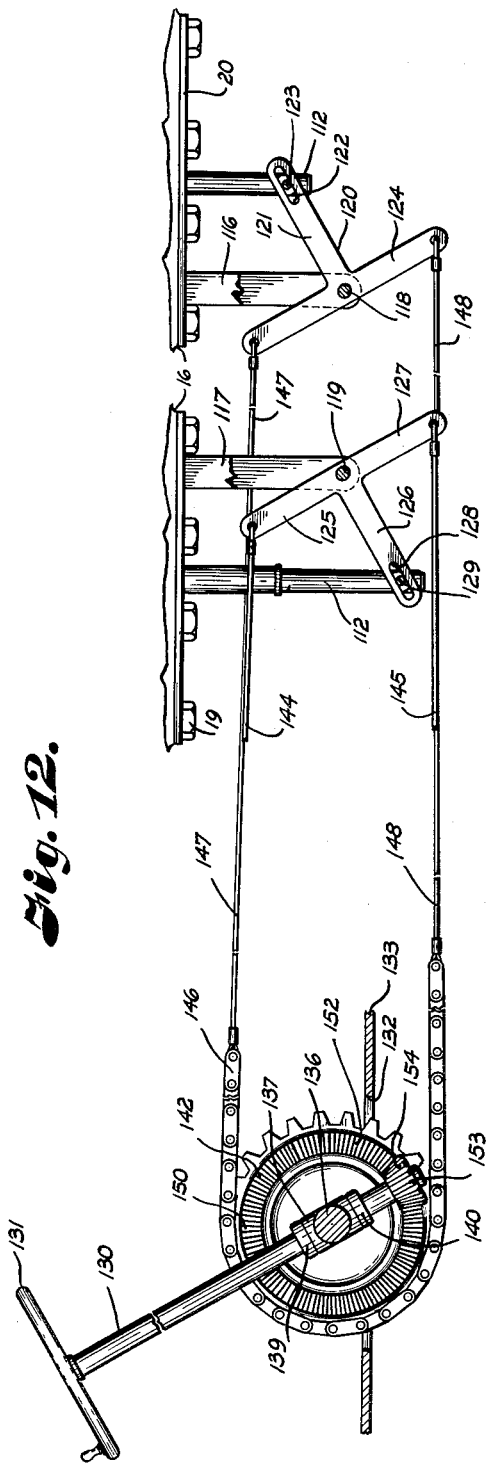
Fig. 12 is a fragmentary partly cross-sectional view taken on a line 12—12, Fig. 10.

When the stick 130 is moved forwardly as shown in Fig. 12 the sprocket 153 will not rotate but swing backwardly with the lower end of the shaft thus causing the sprockets 141 and 142 to move forwardly due to the connection with the sprocket 153 by pins or teeth 154, thereby pulling on the cables 144 and 147. With this operation the pull on cable 144 will cause the arm 126 and shaft 110 to move downwardly thus decreasing the pitch on the blades of propeller 15. Through the pull on cable 147 by sprocket 142 arm 121 and shaft 107 will move upwardly and operate the tilting mechanism of propeller 14 and thereby increasing the pitch of the blades thereon (Fig. 12). The difference in the pitch of the blades of propellers 14 and 15 will cause to move the aircraft forward since the force of the rear propeller 14 is greater due to the increased pitch angle of the blades. During this forward traveling of the aircraft the front section 2 will slant downwardly whereby the propellers 14 and 15 will slant forwardly towards the traveling direction which is necessary for the forward movement of the aircraft (Fig. 1). A further increase of the pitch on the blades of propeller 14 and decrease of the pitch on the blades of propeller 15 will increase the forward speed of the aircraft and also said forward slant of the vehicle.

Movement of the stick 130 backwards or in the opposite direction than that shown in Fig. 12 will obviously cause the reverse movement of the rods 107 and 110. In other words, the rod 110 will be raised and the rod 107 lowered causing an increased angle of pitch on the front propeller blades and a lesser pitch on the rear blades to move the vehicle backwardly.

In operation of the helicopter in flight the propeller blades will be in rotation and have enough pitch for sufficient lifting and driving capacity. The forward motion and varying speeds of the craft are governed by the ratio of the hoisting capacity of each propeller through its variable pitch blades.

In the modified form of the apparatus shown in Fig. 19 operation of the cylindrical head 65 will cause movement of the blades to tilt the same and the arms 72, 73, 74 and 75 are secured to the hub element 49 to provide a pivoting point for the arms instead of to the flange 97 of the head member as illustrated in Fig. 4.

It will be obvious from the foregoing that I have provided an improved apparatus for tilting the blades of aircraft propellers and particularly for the slanting of the vertical shafts of the propellers in helicopters wherein the fuselage is made in two sections and rotatable one with the other.

What I claim and desire to secure by Letters Patent is:

1. In combination with an aircraft having a fuselage and a drive shaft extending longitudinally within the fuselage and power means having driving connections with the drive shaft, propellers including a head for each propeller and having a plurality of blades attached radially therein by annular bearings and by a secondary head centrally located within the propeller head at their axes as a means of control of the slant or pitch of said blades by a forced longitudinal movement thereof, said blades having shanks and being radially attached therein by annular bearings threadedly engaged to their shanks, locknuts engaging said shanks, a split threaded collar clamp engaging the inner end of the shanks for locking said shanks and holding them under constant uniformity, said clamp encircling said shanks and having aligned ears provided with aligned threaded openings, a cap screw for engaging in the threaded openings for tightening said clamp on said shanks, means controlling the pitch of the blades by said secondary head at their axes, including levers connected between said secondary head and the collar clamp on the shank of each blade, and means connected to said secondary head for longitudinal movement thereof to change the pitch of said blades.

2. Propellers for aircraft including a controlling head within a propeller head and positioned at the axis of the propeller head, a plurality of blades having threaded shanks attached radially to both of said heads and secured within the outer head against centrifugal force by internally threaded bearings attached to said threaded shanks near the extended inner ends thereof, and an internally threaded split collar clamp encircling the extended inner end of each shank, means tightening said clamps on each of said shanks, a forked lever integral with each said collar clamp, adjustable rods pivotally connected to said forked levers, secondary levers attached to the inner head, the free ends of the adjustable rods on the forked levers being attached to said secondary levers thereby holding each blade in a uniform fixed position relative to one another and adjusting each blade equally as to pitch by a longitudinal movement of the inner head.

3. In combination with an aircraft having a fuselage and a drive shaft extending longitudinally of the fuselage and power means having driving connection with the drive shaft, propellers including a head and having a plurality of blades thereon, said blades having shanks rotatable in said head and collar clamps rigidly secured to the inner end of the shanks, a tubular propeller shaft, means operatively connecting said propeller shaft to said drive shaft for rotating said propellers, a hub connected to the upper end of the propeller shaft, a guide member secured to the upper end of said hub, a cylindrical head slidable in said guide member, a rod having its upper end connected to said cylindrical head and extending through said tubular propeller shafts, means connected to the lower end of said rod for raising and lowering the same, the improvement consisting of a plurality of spaced arms having one end pivotally secured to the upper portion of the cylindrical head and extending outwardly therefrom, posts having one end pivotally secured to the outer ends of said arms and having their other ends rigidly attached to the propeller head, ears rigidly secured to the collar clamps on the shanks of the blades, and means pivotally connecting said arms to said ears whereby vertical movement of the cylindrical head by said rod will cause the means connecting the arms on the cylindrical head to the ears on said collar clamps to vary the pitch of said blades on the propellers.

4. In combination with an aircraft having a fuselage and a drive shaft extending longitudinally of the fuselage and power means having driving connection with the drive shaft, propellers including a head and having a plurality of blades thereon, said blades having shanks rotatable in said head and collar clamps rigidly secured to the inner end of the shanks, a tubular propeller shaft, means operatively connecting said propeller shaft to said drive shaft for rotating said propellers, a hub connected to the upper end of the propeller shaft, a guide member secured to the upper end of said hub, a cylindrical head slidable in said guide member, a rod having its upper end connected to said cylindrical head and extending through said tubular propeller shafts, and means connected to the lower end of the rod attached to the cylindrical head for raising and lowering the same, the improvement consisting of a plurality of spaced arms having one end pivotally secured to the upper portion of the cylindrical head and extending outwardly therefrom, posts having one end pivotally secured to the outer ends of said arms and having their other ends rigidly attached to said propeller head, ears rigidly secured to the collar clamps on the shanks of the blades, and rods universally connected to said arms spaced from said posts and pivotally connected to said ears, whereby vertical movement of the cylindrical head will cause the rods connecting the arms on the cylindrical head to the ears on said collar clamps to vary the pitch of said blades on the propellers.

5. In combination with an aircraft having a fuselage having two sections rotatably connected together and a drive shaft extending longitudinally of the fuselage and power means having driving connection with the drive shaft, propellers including a head and having a plurality of blades thereon, said blades having shanks rotatable in said head and collar clamps rigidly secured to the inner ends of the shanks, tubular propeller shafts, means operatively connecting said propeller shafts to said drive shaft for rotating said propellers, hubs connected to the upper end of the propeller shafts, guide members secured to the upper end of the hubs, cylindrical heads slidable in said guide members, rods having their upper ends connected to said cylindrical heads and extending through said tubular propeller shafts, means for raising and lowering said rods, the improvement consisting of means movably connecting the cylindrical heads with said propeller blades, whereby vertical movement of the cylindrical head will vary the pitch of said blades on the propellers, said means including a plurality of spaced arms having one end pivotally secured to the upper portion of said cylindrical head and extending outwardly therefrom, posts having one end pivotally secured to said arms and the other ends to said propeller heads, spaced ears on said collar clamps on the propeller shafts, and means pivotally connected to said arms spaced inwardly from said posts and to said ears.

6. In combination with an aircraft having a fuselage and a drive shaft extending longitudinally of the fuselage and power means having driving connection with the drive shaft, propellers including a head and having a plurality of blades thereon, said blades having shanks rotatable in said head and collar clamps rigidly secured to the inner end of the shanks, a tubular propeller shaft, means operatively connecting said propeller shaft to said drive shaft for rotating said propellers, a hub connected to the upper end of the propeller shaft, a guide member secured to the upper end of said hub, a cylindrical head slidable in said guide member, a rod having its upper end connected to said cylindrical head and extending through said tubular propeller shafts, and means connected to the lower end of the rod attached to the cylindrical head for raising and lowering the same, the improvement consisting of a plurality of spaced arms having one end pivotally secured to the upper portion of the cylindrical head and extending outwardly therefrom, posts having one end pivotally secured to the outer ends of said arms and having their other ends rigidly attached to said propeller head, ears rigidly secured to the collar clamps on the shanks of the blades, and rods universally connected to said arms spaced from said posts and pivotally connected to said ears, and means connected to the lower end of said rod for raising and lowering the same whereby vertical movement of the cylindrical head will cause the rods connecting the arms on the cylindrical head to the ears on said hubs to vary the pitch of said blades on the propellers, said last named means including an arm depending from the fuselage adjacent said rod, a T-shaped bracket member pivotally mounted on said arm, said bracket having one end of one arm thereof pivotally connected to the lower end of said rod, a guide stick having gears on its lower end engaging teeth on sprockets mounted in said fuselage spaced from said rod, chains running over said sprockets and having cables with their free ends connected to the outer ends of one arm of said T-shaped bracket whereby movement of said stick will raise and lower said rod.

References Cited in the file of this patent
UNITED STATES PATENTS

| | | |
|---|---|---|
| 1,203,557 | Gallaudet | Oct. 31, 1916 |
| 1,977,031 | Zipay | Oct. 16, 1934 |
| 2,484,739 | Remmen | Oct. 11, 1949 |
| 2,488,018 | Marriage | Nov. 15, 1949 |
| 2,494,209 | Sikorsky | Jan. 10, 1950 |
| 2,753,004 | Jovanovich | July 3, 1956 |

FOREIGN PATENTS

| | | |
|---|---|---|
| 442,015 | Great Britain | Jan. 27, 1936 |